3,437,004
SHEET METAL EXPANDABLE FASTENER
George H. Pacharis, Wyomissing, Pa., assignor to USM Corporation, Flemington, N.J., a corporation of New Jersey
Filed July 25, 1967, Ser. No. 655,865
Int. Cl. F16b 13/10
U.S. Cl. 85—71                          4 Claims

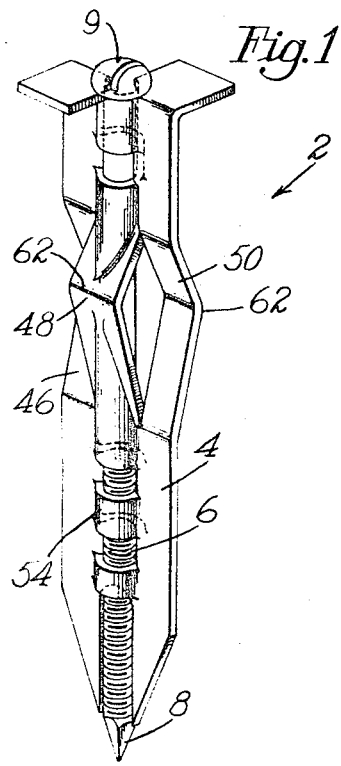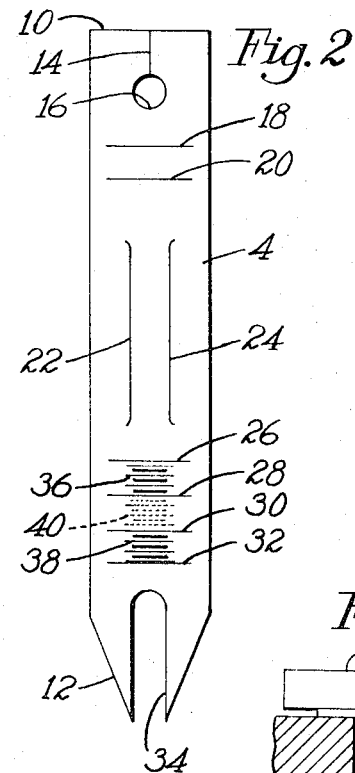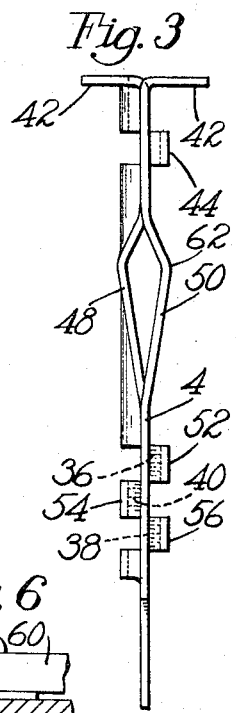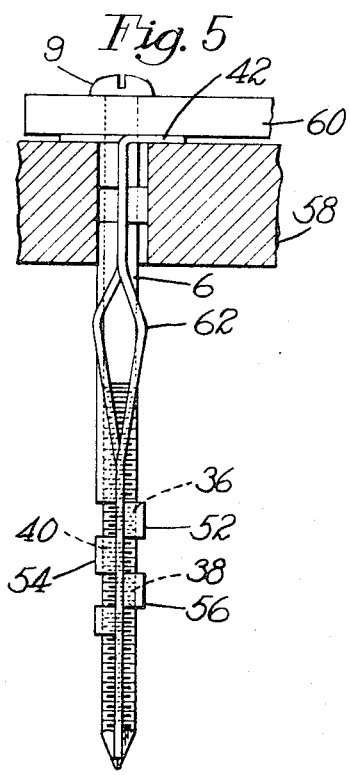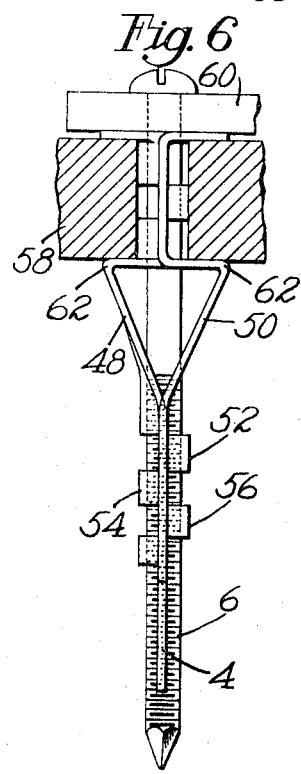
Inventor
George H. Pacharis
By his Attorney
Scott R. Luster United States Patent Office 3,437,004
Patented Apr. 8, 1969

ABSTRACT OF THE DISCLOSURE

A fastening device having a wall piercing point and a deformable member, which device may be initially driven through a surface and then firmly secured thereto.

BACKGROUND OF THE INVENTION

Field of the invention

This invention relates to fastening devices and is directed more particularly to such devices of the class commonly known as "blind fasteners," that is, fasteners which can be utilized to assemble joints by operations which can be performed from one side of the work.

Description of the prior art

In the mounting of various structural elements on supports, walls, or the like, it is often necessary to provide fastener receiving means in the support or wall in order to attach structural components thereto. In many cases it is possible to employ conventional nuts which engage bolts or screws on the inside of the support. However, the nature of the structure often precludes the use of a nut on the inside of the support, e.g., where the inside of the support or wall is inaccessible.

In the home, difficulty is often experienced in attaching screws to various supporting structures, particularly plastic walls and hollow doors, for the mounting of mirrors, towel bars, medicine cabinets, curtain fixtures and the like. In such situations it is necessary to provide fastener means which may be installed without having access to the "blind" side of the support. Frequently, expansion anchors are used as retaining means for a screw.

Expansion anchors are generally known in the art and one well known type comprises a sleeve for supporting a screw. The sleeve is generally die stamped from a sheet of metal which is then bent into cylindrical shape and its opposite end portions soldered or welded together. The sleeve is then threaded internally to receive a screw or threaded bolt extending through the sleeve and disposed axially thereof.

To obviate the necessity of drilling a hole for receiving the anchor, the screw may be provided with a point at the blind end to facilitate driving the device through a support in the same manner as driving a nail. After the device is so driven into the structure, it is "expanded" by turning the screw in the sleeve, causing the sleeve to be deformed radially outwardly from the screw whereby the device is firmly anchored to the support.

The materials and number of operations involved in the manufacture of expansion anchors as described above has maintained the cost of such devices at undesirable levels. More recently, in order to reduce manufacturing costs, the sleeve portions have been made of a plastic material molded in the desired cylindrical shape. Some reductions in cost have been realized by the use of molded partial threads on the interior of the sleeve portions. However, the basic design of the most popular expansion anchors has remained essentially unchanged and the manufacturing cost has remained at relatively high levels.

SUMMARY OF THE INVENTION

Accordingly, it is an object of the present invention to provide an expandable fastener suitable for use as a blind fastener.

It is a further object of the invention to provide such a fastener which can be driven nail-fashion into a support.

It is still a further object of the invention to provide a fastener of the driving, expanding type which is significantly less expensive to manufacture than previously known like devices.

It is still a further object of the invention to provide a fastener which may be used in the home with ordinary household tools, i.e., hammer and screwdriver.

With the above and other objects in view, as will hereinafter appear, the present invention in one aspect thereof contemplates an expandable fastener comprising a substantially flat member having portions displaced from the plane of the member, the portions being adapted to receive a threaded screw having a slotted head at one end and a point at the other end. The flat member constitutes the deformable member, which, after the device is driven into a support, is caused by turning of the screw to bend radially outwardly from the screw to lock the device to the support.

The above and other features of the invention, including various novel details of construction and combination of parts will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawings in which there is shown an illustrative embodiment of the invention from which its novel features and advantages will be apparent.

FIG. 1 is a perspective view of one form of fastener embodying the invention;

FIG. 2 is an elevational view of a portion of the fastener in the early stages of the manufacture of the device;

FIG. 3 is an elevational edge view of the fastener portion of FIG. 2, shown after it has been formed for receiving a threaded member;

FIG. 4 is an elevational edge view similar to FIG. 3 but showing a threaded member completing the fastener;

FIG. 5 shows the fastener of FIG. 4 supporting a bracket and driven into a wall or like structure; and FIG. 6 is similar to FIG. 5 but showing the fastener in its expanded condition.

DESCRIPTION OF THE PREFERRED EMBODIMENT

Referring to FIG. 1, it may be seen that the illustrative device comprises a fastener 2 which includes a generally planar member 4 which receives a screw 6 having a nail-like point 8 at one end and a head 9 at the other end.

In the manufacture of the illustrative device the member 4 is first cut in entirely planar form, as may be seen in FIG. 2, and is provided with a flat end 10 and a pointed end 12. To facilitate forming of the member 4 as it will be used in the fastener, the flat end 10 is bisected by a vertical cut 14 terminating at an aperture 16. Below the aperture 16 are two horizontal cuts 18, 20 and two substantially vertical cuts 22, 24. To further facilitate forming of the member 4 as it will be used in the fastener, below the vertical cuts 22, 24 there are provided a plurality of horizontal cuts, for example four cuts 26, 28, 30, 32, as shown in FIG. 2. The pointed end 12 is bifurcated by a slot 34.

To facilitate engagement with a screw, the member 4 is provided with threads 36 between the cuts 26, 28, threads 38 between the cuts 30, 32, and threads 40 provided between the cuts 28, 30, but on the other side of the member 4, for purposes which will be made clear hereinbelow.

The member 4, as shown in FIG. 2 is subjected to bending operations which force the member into the configuration shown in perspective in FIG. 1 and in edge view in FIG. 3. Tabs 42 are formed by the cut 14 and aperture 16 and extend outwardly from the member 4 and substantially normal thereto to retain the head 9 of the screw 6. A retaining band 44 is formed by widthwise portions of the member 4 resulting from the cuts 18 and 20. Collapsible legs 46, 48, 50 are formed by longitudinal segments resulting from the cuts 22, 24. Bending out of the planar member portions between the cuts 26, 28, 30 and 32 produces a series of retaining bands 52, 54 and 56 housing the internal threads 36, 40 and 38 respectively.

After being shaped as shown in FIG. 3, the member 4 receives the screw 6, as shown in FIGS. 1 and 4. The external threads of the screw 6 are engageable with the internal threads 36, 40, 38 of the retaining bands 52, 54 and 56, respectively.

In operation, the device as shown in FIGS. 1 and 4 is driven, as by hammer blows, into and through a support structure 58 (FIG. 5). When the tabs 42 are abutting the surface of the support 58, the screw 6 is withdrawn and inserted in the screw hole of a bracket or like fixture 60 to be secured to the support 58. The screw 6 is reinserted in the member 4. The screw threads engage the retainer band threads 36, 40, 38 to firmly interlock the two portions of the fastener.

To secure the bracket or other fixture 60 to the support 58 the screw is turned further to force the retaining bands 52, 54, 56 toward the head of the screw. The legs 46, 48, 50 which in the forming process are bent slightly, as at 62, bend further outwardly from the screw 6 to effect an "expansion" of the member 4 on the blind side of the support 58. As shown in FIG. 6, the outward deformation of the legs firmly anchors the fastener in the support 58.

If it is subsequently desired to remove the fixture 60 from the support 58, such may be accomplished by simply unscrewing the screw and removing it from the member 4 which remains in its deformed condition. If a second fixture is to be hung in place of the first, the screw can be reinserted in the deformed and expanded member 4 which will serve to hold the second fixture as securely as the first.

It will be appreciated that the manufacture of this device, as described above, involves a minimum of machining operations with consequent reductions in manufacturing costs. The device has been found particularly useful in connection with wallboard, plaster board and the like.

Having thus described my invention, what I claim as new and desire to secure by Letters Patent of the United States is:

1. An expandable fastener comprising a substantially planar member having a first end for driving through a support, portions of said member being displaced from the plane of said member to receive a screw, a plurality of displaced portions being proximate to the first end of the member and having internal threads for engagement with said screw, said screw being received in a slot which bifurcates said first end of said planar member, and at least one longitudinal segment of said member being disposed between said internal threads and a second end of said member and bowed outwardly from the plane of said member, said segment being deformable further outwardly by the turning of said screw in said member to engage a surface of said support.

2. An expandable fastener comprising a substantially planar member having a first end for driving through a support, said planar member having a second end for receiving a screw and retaining a screw head, portions of said member being displaced from the plane of said member to receive a screw, a screw for insertion into said displaced portions, a plurality of said displaced portions being proximate to the first end of the member and having internal threads for engagement with said screw, said screw being received in a slot which bifurcates said first end of said planar member, and segments of said member between said internal threads and the second end of the member being bowed outwardly from the plane of the member and longitudinally of the member, said segments being deformable further outwardly by the turning of said screw in said member to engage a surface of said support.

3. An expandable fastener comprising a substantially planar member having a pointed end for driving through a support, said planar member pointed end being bifurcated by a slot extending longitudinally of the member, said planer member having a second end for receiving a screw, said second end having tab means normal to the plane of the member for retaining a screw head, a first portion of said member proximate to the tab end of said member being displaced from the plane of the member widthwise of said member to receive a screw, a screw for insertion into said displaced portion, said screw having a pointed end and a headed end, said screw being disposed in said slot in said planar member, the pointed end of said screw extending beyond the pointed end of said member, second and third portions of said member proximate to the pointed end of said member being displaced from the plane of said member widthwise of the member to receive said screw, said second and third portions having internal threads for engagement with said screw, and longitudinal segments of said member between said second and third portions and said first portion of the member being bowed outwardly from the plane of the member, said segments being deformable further outwardly by the turning of the screw in the member to engage a surface of said support.

4. An expandable fastener comprising a substantially planar member having a first end for driving through a support, said planar member having a second end for receiving a screw and retaining a screw head, portions of said member being displaced from the plane of said member to receive a screw, a screw for insertion into said displaced portions, a plurality of said displaced portions being proximate to the first end of the member and having internal threads for engagement with said screw, said screw having one end which is pointed and which extends beyond the first end of the planar member, said screw being received in a slot which bifurcates said first end of said planar member, and segments of said member between said internal threads and the second end of the member being bowed outwardly from the planar member and longitudinally of the member, said segments being deformable further outwardly by the turning of said screw in said member to engage a surface of said support.

References Cited

UNITED STATES PATENTS

| 964,226 | 7/1910 | Farrand | 85—11 |
| 2,755,453 | 7/1956 | Cloutier | 85—11 |
| 3,143,915 | 8/1964 | Tendler | 85—71 |

FOREIGN PATENTS

| 211,483 | 11/1957 | Australia. |
| 703,530 | 3/1941 | Germany. |

MARION PARSONS, Jr., *Primary Examiner.*